US012634279B1

(12) United States Patent
Shipley et al.

(10) Patent No.: US 12,634,279 B1
(45) Date of Patent: May 19, 2026

(54) REFRESH RATE DETECTION-BASED VIDEO AUTHENTICATION METHOD AND SYSTEM

(71) Applicant: UIPCO, LLC, San Antonio, TX (US)

(72) Inventors: Brian Francisco Shipley, Plano, TX (US); Brian Tougas, Spring Branch, TX (US); Gideon Bowie Luck, Wylie, TX (US); Sean Carl Mitchem, San Antonio, TX (US); Christopher Russell, The Colony, TX (US); Andre Rene Buentello, San Antonio, TX (US); Jose L Romero, Jr., San Antonio, TX (US); David Joaquin Harris, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 628 days.

(21) Appl. No.: 18/174,169

(22) Filed: Feb. 24, 2023

Related U.S. Application Data

(60) Provisional application No. 63/268,635, filed on Feb. 28, 2022.

(51) Int. Cl.
*G06F 21/00* (2013.01)
*H04L 9/40* (2022.01)

(52) U.S. Cl.
CPC ...... *H04L 63/0861* (2013.01); *H04L 63/0853* (2013.01); *H04L 63/102* (2013.01)

(58) Field of Classification Search
CPC ....................... H04L 63/0861; H04L 63/0853; H04L 63/102
See application file for complete search history.

(56) References Cited

U.S. PATENT DOCUMENTS

| | | | | |
|---|---|---|---|---|
| 10,785,021 B1 * | 9/2020 | Prabhat | ................. | H04L 9/0863 |
| 11,044,247 B2 * | 6/2021 | Lee | ....................... | H04L 63/102 |
| 12,432,201 B1 * | 9/2025 | Lyle | ................... | H04L 63/0853 |
| 2012/0191575 A1 * | 7/2012 | Vilke | ................. | G06Q 30/0641 |
| | | | | 705/27.1 |
| 2021/0014539 A1 * | 1/2021 | Gao | ................. | H04N 21/41407 |
| 2021/0125551 A1 * | 4/2021 | Siddiqui | .............. | G06F 1/3212 |
| 2021/0125554 A1 * | 4/2021 | Lee | .......................... | G06F 1/206 |
| 2022/0078149 A1 * | 3/2022 | Hines | .................. | G06F 3/04842 |
| 2023/0214481 A1 * | 7/2023 | Singh | ....................... | G06F 21/44 |
| | | | | 726/26 |
| 2024/0427871 A1 * | 12/2024 | Sanctis | ................... | G06F 21/32 |

* cited by examiner

*Primary Examiner* — Kendall Dolly
(74) *Attorney, Agent, or Firm* — Plumsea Law Group, LLC

(57) ABSTRACT

A refresh rate detection-based method and system of performing an authentication of video of a person in order to authorize access to a secured resource is disclosed. The user provides image data in which they present a secondary computing device which, in response to a signal from the authentication system, employ a dynamic refresh rate when displaying visual content. The system and method are configured to evaluate the image data to determine whether the dynamic refresh rate pattern is present. If a change in the refresh rate is present, the system determines the image is authentic and can verify an identity of the person. In some cases, the system can further be configured to then automatically grant the person access to one or more services, features, or information for which he or she is authorized.

20 Claims, 9 Drawing Sheets

AUTHENTICATION REQUEST

MSR: PLEASE ORIENT WEBCAM TOWARD YOUR SELECTED DEVICE DISPLAY

MSR: READY?

YOU: YES

VIDEO CAPTURE IN PROGRESS

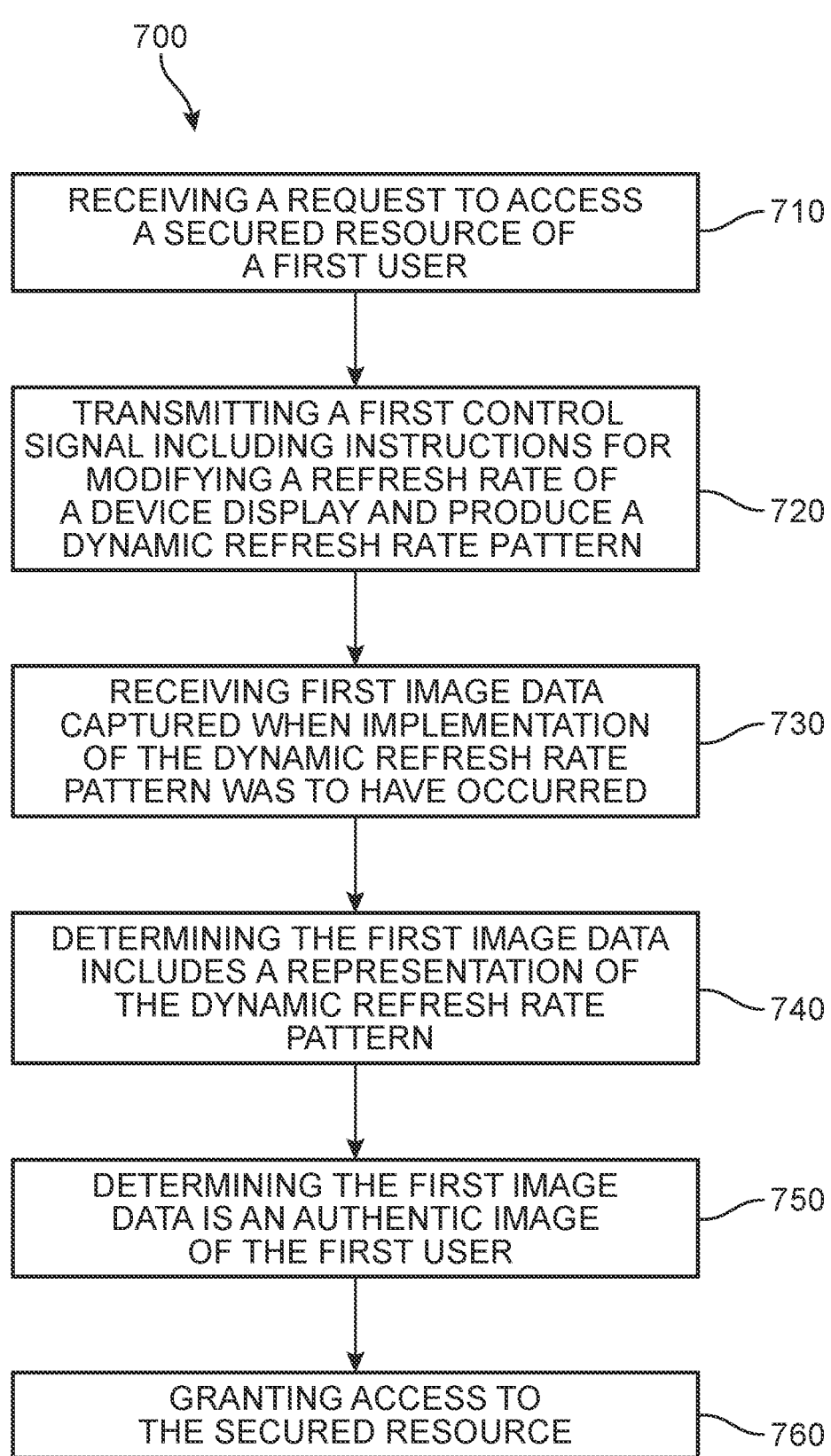

700

RECEIVING A REQUEST TO ACCESS
A SECURED RESOURCE OF
A FIRST USER ⟋710

TRANSMITTING A FIRST CONTROL
SIGNAL INCLUDING INSTRUCTIONS FOR
MODIFYING A REFRESH RATE OF
A DEVICE DISPLAY AND PRODUCE A
DYNAMIC REFRESH RATE PATTERN ⟋720

RECEIVING FIRST IMAGE DATA
CAPTURED WHEN IMPLEMENTATION
OF THE DYNAMIC REFRESH RATE
PATTERN WAS TO HAVE OCCURRED ⟋730

DETERMINING THE FIRST IMAGE DATA
INCLUDES A REPRESENTATION OF
THE DYNAMIC REFRESH RATE
PATTERN ⟋740

DETERMINING THE FIRST IMAGE
DATA IS AN AUTHENTIC IMAGE
OF THE FIRST USER ⟋750

GRANTING ACCESS TO
THE SECURED RESOURCE ⟋760

FIG. 7

REFRESH RATE DETECTION-BASED VIDEO AUTHENTICATION METHOD AND SYSTEM

CROSS-REFERENCE TO RELATED APPLICATION

This application claims the benefit of U.S. Provisional Patent Application Ser. No. 63/268,635 filed on Feb. 28, 2022 and titled "Refresh Rate Detection-Based Video Authentication Method and System", the disclosure of which is incorporated by reference herein in its entirety.

TECHNICAL FIELD

The present disclosure generally relates to identity authentication, and specifically to a method and system for authentication of videos of persons seeking access to one or more secured services, features, and resources. The authentication is based on detection of a particular refresh rate for the video that is detected in image data transmitted by the user's computing device.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an authenticity of image data in order to protect user resources. The method includes a first step of receiving, at an authentication computing system and from a first computing device, a request to access a secured resource of a first user, and a second step of transmitting, from the authentication computing system and in response to the request, a first control signal to a second computing device associated with the first user to implement a dynamic refresh rate pattern. In one embodiment, the first control signal includes instructions for modifying a refresh rate of a display for the second computing device. A third step includes receiving or obtaining, at the authentication computing system, first image data captured by the first computing device when implementation of the dynamic refresh rate pattern via the second computing device was to have occurred. In some embodiments, the first image data also includes a face of a person. A fourth step includes determining, based on content shown on a screen of the second computing device present in the first image data, that the first image data includes a representation of the dynamic refresh rate pattern, and a fifth step includes determining, in response to the first image data including a representation of the dynamic refresh rate pattern, that the first image data is an authentic image of the first user, thereby granting access to the secured resource via the first computing device.

In another aspect, a method of detecting fraudulent attempts to obtain access to secure user data using image data is disclosed. The method includes a first step of receiving, at an authentication computing system and from a first computing device, a request to access a secured resource of a first user, and a second step of transmitting, from the authentication computing system and in response to the request, a first control signal to a second computing device associated with the first user to implement a dynamic refresh rate pattern, the first control signal including instructions for modifying a refresh rate of a display for the second computing device. In addition, a third step includes receiving or obtaining, at the authentication computing system, first image data captured by the first computing device when implementation of the dynamic refresh rate pattern via the second computing device was to have occurred, the first image data also including a face of a person. A fourth step includes determining that the first image data fails to include a representation of a dynamic refresh rate pattern, and a fifth step includes determining, in response to the first image data failing to include a representation of the dynamic refresh rate pattern, that there is a high likelihood of the request originating from a fraudulent source, with a sixth step of denying the request and blocking access to the secured resource in response to the failure.

In another aspect, a system for verifying an authenticity of video in order to protect user resources includes a processor and machine-readable media. The machine-readable media include instructions which, when executed by the processor, cause the processor to receive, at an authentication computing system and from a first computing device, a request to access a secured resource of a first user, and to transmit, from the authentication computing system and in response to the request, a first control signal to a second computing device associated with the first user to implement a dynamic refresh rate pattern, the first control signal including instructions for modifying a refresh rate of a display for the second computing device. In addition, the instructions cause the processor to receive, at the authentication computing system, first image data captured by the first computing device when implementation of the dynamic refresh rate pattern via the second computing device was to have occurred, the first image data also including a face of a person, and to determine, based on a content shown on a screen of the second computing device present in the first image data, that the first image data includes a representation of the dynamic refresh rate pattern. Finally, the instructions cause the processor to determine, in response to the first image data including a representation of the dynamic refresh rate pattern, that the first image data is an authentic image of the first user, and thereby grant access to the secured resource via the first computing device.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 is a flow chart depicting a process of verifying an authenticity of video in order to protect user resources, according to an embodiment.

DETAILED DESCRIPTION

Figure 1:
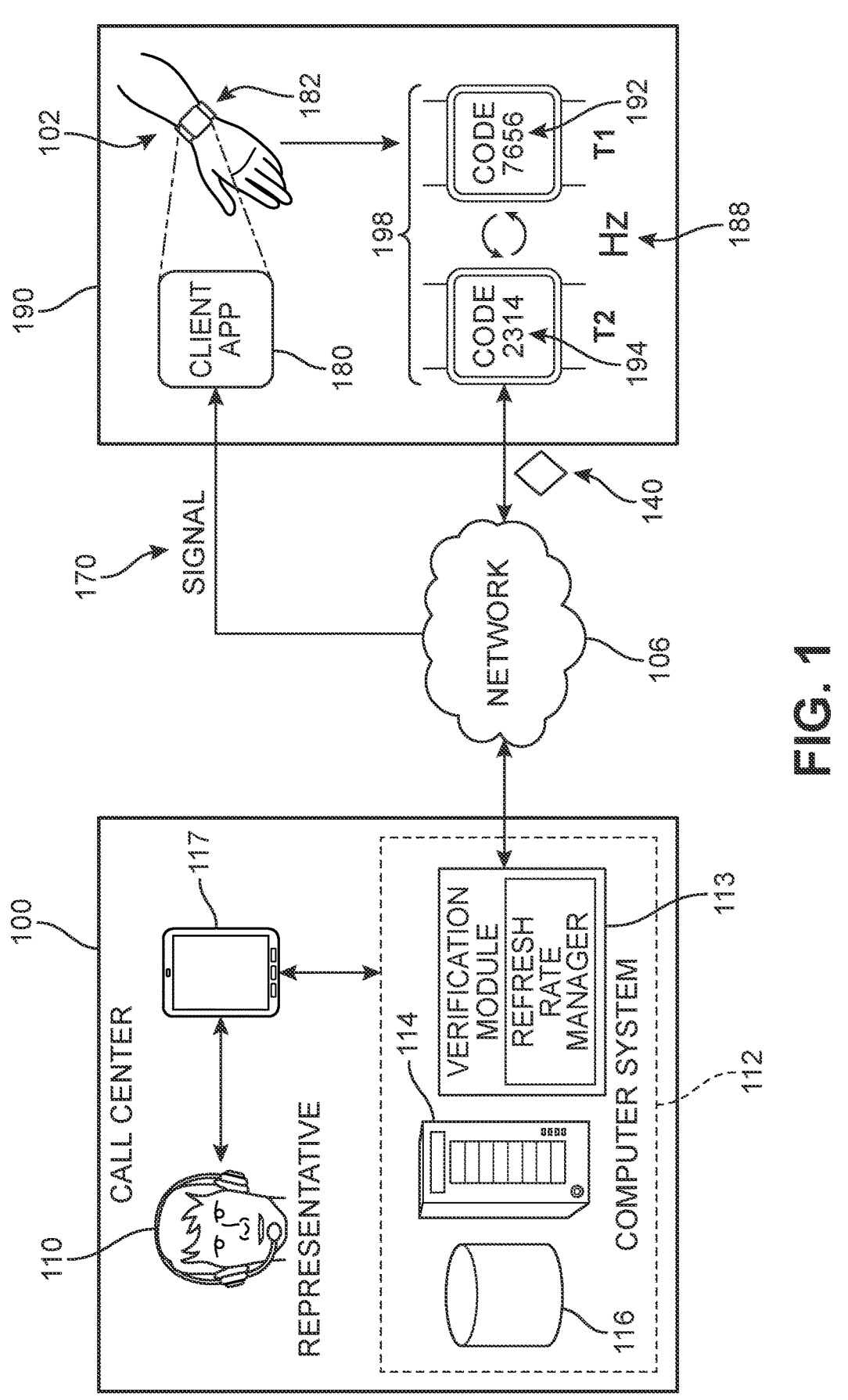
FIG. 1 is an overview of a scenario in which image data of a person wearing a secondary computing device is captured during a communication session in order to obtain access to a secured resource based on the refresh rate of a display of the secondary computing device, according to an embodiment.

The embodiments provide a method and system of authenticating user videos and other streaming image data in a more secure and more efficient manner by altering a refresh rate of a user's computing device (e.g., phone, tablet, etc.). More specifically, the system contemplates recording a user via a camera of a primary computing device while a secondary user computing device ("secondary device") is in the field of view of the camera. In one embodiment, the system can generate a signal that causes a change in the refresh rate for the display of the secondary device; this change is recorded by the primary device and transmitted back to the system. This process can occur, for example, during a video session with a customer representative. In some cases, the representative may manually initiate the transmission of the control signal. In other cases, the system could be configured to monitor the position and orientation of the secondary device in the video feed. When the secondary device is in an appropriate position and orientation, the system could send a signal to have the device refresh rate change, and this output could be automatically detected within the video.

In one embodiment, a user could run an application that is configured to automatically cause an adjustment of their secondary device's refresh rate during video calls. In some embodiments, during a video call with a third party, if a user is asked to show an authentication code on their device, the application used to display the code could also adjust the refresh rate of all or part of the screen. Depending on the new refresh rate and/or camera properties, the third party may observe a flickering effect in the video, or may otherwise be able to detect this change in the refresh rate. The third party can then manually authenticate the user based on this observation. Alternatively, in one embodiment, the system can be configured to detect the refresh rate and automatically authenticate the user. In another example, the third party can transmit a remote command to the user's app to adjust the refresh rate. It can be appreciated that such a system would significantly improve the detection of deep fake videos. For example, if an attacker is trying to fake the use of the user's device, the third party would not see evidence of a changed refresh rate and would then know the member has not been authenticated. The requester's access to secured resources could then be blocked, maintain the integrity of the user.

As will be described in greater detail below, an authentication process and system based on a user device's refresh rate may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of computing devices with image sensors in the day-to-day life of the modern consumer.

As a general matter, a display device's refresh rate—also referred to herein as a refresh pattern—refers to the number of times per second that a raster-based display device displays a new image. On cathode ray tube (CRT) displays, higher refresh rates produce less flickering. In other technologies such as liquid-crystal displays (LCDs), the refresh rate affects how often the image can potentially be updated. The refresh rate can also determine the highest frame rate that can be displayed, and despite there being no actual blanking of the screen in LCDs, the vertical blanking interval is still a period in each refresh cycle when the screen is not being updated. Different operating systems set the default refresh rate differently; for example, Microsoft Windows® 95 and 98 set the refresh rate to the highest rate the display supports, while Windows® NT-based operating systems and its descendants set the default refresh rate to a conservative rate, usually 60 Hz. Some applications, including many games, allow the user to reconfigure the refresh rate, but most default to a conservative resolution and refresh rate and let the user increase the rate in the settings. It should be understood that the proposed systems are configured to take into account the varying refresh rates of display, as will be described below.

In different embodiments, the system contemplates the capture of video or images during communication sessions with a user that include a particular refresh rate or a particular refresh pattern (e.g., fast-slow-slower-faster). This can occur, for example, during a video session with a customer representative. In some embodiments, the default refresh rate of a user's secondary computing device has been previously provided to the system to facilitate the detection of a change in the refresh rate. In another example, the system will detect the device's current refresh rate, and then initiate a change to the refresh rate. If this change is detected by the authentication system it can be used to indicate that this is not a faked video.

In different embodiments, such an approach can be advantageous in combating the growing threat of video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c)

biometric factors, such as voice recognition, facial recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body (e.g., adjusting the position of their arm) from one location to another are passive interactions, as the person could perform these activities regardless of the authentication system that is in place. However, other user actions, such as but not limited to providing a passcode, security question answers, etc. are active inputs and a system requiring any of these types of information would not be considered passive. In addition, this type of arrangement—relying on secondary devices—precludes the need to previously record and store any biometric data (e.g., retinal scan, fingerprint scan, voice-print, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their computing device.

The following systems describe a process of authentication that serves as a reliable barrier to deep fake imposter attacks. In other words, deep fakes-being dependent on images previously captured of the target accountholder taken by cameras—may appear to show the secondary device display, but would not include the change in refresh rate. The absence of this change in the image captured would alert the system to the threat of forgery.

For purposes of introduction, an overview of one embodiment of the proposed systems and methods is illustrated with reference to FIG. 1. In FIG. 1, an example of an authentication process is shown in which a first user 102 (represented by an arm), in a first location 190, is on a call with a representative 110 who is at a call center 100, or otherwise in a remote location relative to the first user 102. The first user 102 is conversing with representative 110 in order to be authenticated and then obtain access to their account or other secured resource. In different embodiments, first user 102 can participate in the communication session via a telephone or a computing device configured with a network connection and connected to a camera or other image sensor, depending on the mechanism utilized for data transmission.

In some embodiments, first user 102 may have access to a secondary user computing device ("secondary device") 182. In one embodiment, secondary device 182 is a mobile device, for example, a smartphone, tablet, or a smartwatch, or other wearable or portable smart computing device that can receive signals over a network including but not limited to smart glasses, smart jewelry, smart medical devices, smart apparel, and other smart wearable accessories. In addition, though not shown in FIG. 1, the user requesting access can make use of a primary computing device ("primary device") through which the communication session occurs. The primary device can include a tablet, a laptop, a smartphone, a desktop computer, or similar kind of device that includes a camera or other image sensor that allows user 102 to contact call center 100. For example, the first user 102 can be speaking and listening to the representative 110 via a desktop computer. For purposes of this example, the first customer 102 has just been connected to representative 110 and is seeking access to their account details.

In different embodiments, the secondary device 182 and/or primary device can include an electronics unit comprising a plurality of different components, such as one or more of various user interface components (e.g., a touchscreen or other display whose refresh rate can be manipulated, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The secondary device 182 and/or primary device may be configured to receive and analyze data from various input sensors associated the device or data that is communicated from external components or devices to the device. In some cases, the secondary device 182 and/or primary device may also include a navigation system equipped with a GPS receiver that can receive GPS information or other receivers capable of receiving global or local positioning information.

A communication module may allow the secondary device 182 and/or primary device to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the secondary device 182 and/or primary device may include a device display ("display") that can, for example, present information and various media for a product/service support software application ("app") 180. In some embodiments, the app 180 is associated with the provider of the product/service for which the service representative is offering support. In some embodiments, the first user 102 can receive and send information through a user interface that may be presented on a display for the primary device. In some embodiments, the display may be a touchscreen, allowing the customer to interact with the user interface directly by touch. The user interface may refer to an operating system user interface or the interface of one or more software applications that may run on the either or both of the primary device and secondary device 182. In some embodiments, the user interface can include a messaging window or other chat-space by which the service representative may send messages or other digital content. Alternatively, in some embodiments, the first user 102 can also speak with the service representative via a voice calling application on primary device, or directly through a telephone or other external device, while separately submitting a video recording.

In an example embodiment, customer service call center 100 includes at least one computer system 112. The term "computer system" refers to the computing resources of a single computer, the partial computing resources of a single computer, a plurality of computers communicating with one another, or a network of remote servers. In one embodiment, computer system 112 includes at least one server having at least one processor.

In the embodiment of FIG. 1, computer system 112 includes one or more computing devices 114 (for example, a server) that may be in communication with one or more databases 116. Databases 116 could be co-located with computing devices 114 or could be remote databases that are accessible by computing devices 114 over a network. Databases 116 can include any kind of storage devices, including but not limited magnetic, optical, magneto-optical, and/or memory, including volatile memory and non-volatile memory. In an example embodiment, computer system 112 may also include or be configured with access to an access management system (see FIG. 2), of which a secondary device control signal generation and verification module ("verification module") 113 is a component. In some embodiments, verification module 113 may be implemented in software, hardware, or a combination thereof. In addition, in some embodiments, verification module 113 can include or make use of a refresh rate manager.

In different embodiments, while the first user 102 is communicating with representative 110, the access management system can be configured to verify an identify of a person so as to either permit or deny access to the user-identity dependent services. As used herein, the term "user" or "member" or "account holder" should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed.

In some embodiments, representative 110 may have access to a device of computer system 112, for example a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, view image data, send documents and forms to a customer, provide access to a secured resource, and/or perform other tasks required to help a customer calling in to call center 100.

In some embodiments, both representative device 117 and secondary device 182 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, secondary device 182 could operate in a client-server relationship with one or more servers of computer system 112. For example, computer system 112 may include a server that communicates with secondary device 182, primary device, as well as other remote devices (e.g., user devices of other customers) over a network 106. The primary device and/or secondary device 182 may provide the front-end of a system that provides users with options for performing various kinds of tasks (for example, making fund transfers when the company is a bank). In some cases, primary device and/or secondary device 182 may run client software through a web browser, in which case the client software may be hosted on a server associated with computer system 112. In other cases, secondary device 182 and/or primary device may run client software in the form of a native software application that has been downloaded through a centralized marketplace (i.e., an "app store"). In some cases, while the client software that allows users to perform various tasks may be run on primary device or secondary device 182, the data may be retrieved from and stored on databases associated with computer system 112 (e.g., databases 116).

During the call between representative 110 and first user 102, the first user 102 requests access to an account or other secured resource of the first user. In response, in different embodiments, the remote access management system can automatically, or at the manual request of the service representative, initiate an authentication procedure, action, or task that includes a remote signaling event. As a general matter, a remote signaling event refers to the process and period during which the authentication system issues a control signal to a remote user device over a network, and the control signal causes the user's secondary device to visibly respond, via its display.

In different embodiments, the access management system, through verification module 113, can then generate one or more signals 170 that are transmitted over network 106 to cause the implementation of a dynamically changing refresh rate at the selected device display. The signals 170 can, for example, include a specific refresh rate or refresh rate sequence ("dynamic refresh rate", "refresh rate pattern", or simply "pattern"), as well as a request to the secondary device 182 to employ this refresh rate pattern at a specific time. The signals 170 are received by the secondary device 182 that is known to be associated with the first user (e.g., based on a previous device registration session). For example, app 180 can receive signals 170 as a control signal that causes the app to alter the refresh rate for secondary device 182, thereby producing a particular display output that will be recorded by a camera for the primary device. In FIG. 1, in response to the signals 170, the secondary device 182 produces an image or sequence of images ("onscreen image data") on a display for the secondary device that corresponds to the selected refresh rate pattern.

In different embodiments, the system also includes provisions for accurately capturing the refresh rate of the secondary device display. For example, the signals 170 can also trigger the display of a specific series of visual tokens, such as a sequence of flashes occurring within a few seconds, with the duration of each flash and time between flashes comprising the pattern, and/or a sequence of flashes of various colors, a specific graphic or animation, a number or other alphanumerical message, a sequence of images or indicia that are animated, etc. These visual tokens will be presented at varying frame rates, and whether they are displayed by the secondary device will depend on the refresh rate being employed at that time.

For purposes of illustration, a visual sequence 198 comprising at least a first visual token 192 and a second visual token 194 has been generated by the app 180 or otherwise provided to the secondary device 182 by the system. In this non-limiting example, the first visual token 192 is a numeric code "7656" and the second visual token 194 is another, different numeric code "2314". At the same time that a 188 refresh rate pattern is to be implemented by the secondary device, the visual sequence 198 is also presented.

Furthermore, at or around the same time, in a different but synchronized or linked remote signaling event, the verification module 113 can also generates a control signal that requests or triggers a capture of a sample of image data 140 by a camera of (or connected to) the primary device. In some embodiments, the image data 140 is a segment taken from a video stream received during the communications session. This captured image data 140 can include an image of the secondary device 182 as well as the face of the user or other objects in the physical space (first location 190). A physical space can refer to any physical environment such as a room in an office, residence, or other building, as well as open or outdoor spaces. The captured image data 140 is received by the remote access management system via network 106.

Based on the received image data 140, the system will determine whether to authenticate the user for access to the secured resource. For example, the verification module 113 can process and analyze image data 140 and determine whether the image data 140 includes a depiction or representation of the onscreen image data pattern that should have been executed by the secondary device 182. If the expected pattern is detected in the image data 140, the authenticity of the video or image can be verified, providing an additional layer of veracity to the user's identity. In this example, image data 140 does include an image of the pattern, and the system automatically communicates this information to the service representative. Thus, in FIG. 1, without further action or presentation of credentials by first user 102, the communication session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the image data capture of the display of their secondary device.

Figure 2:
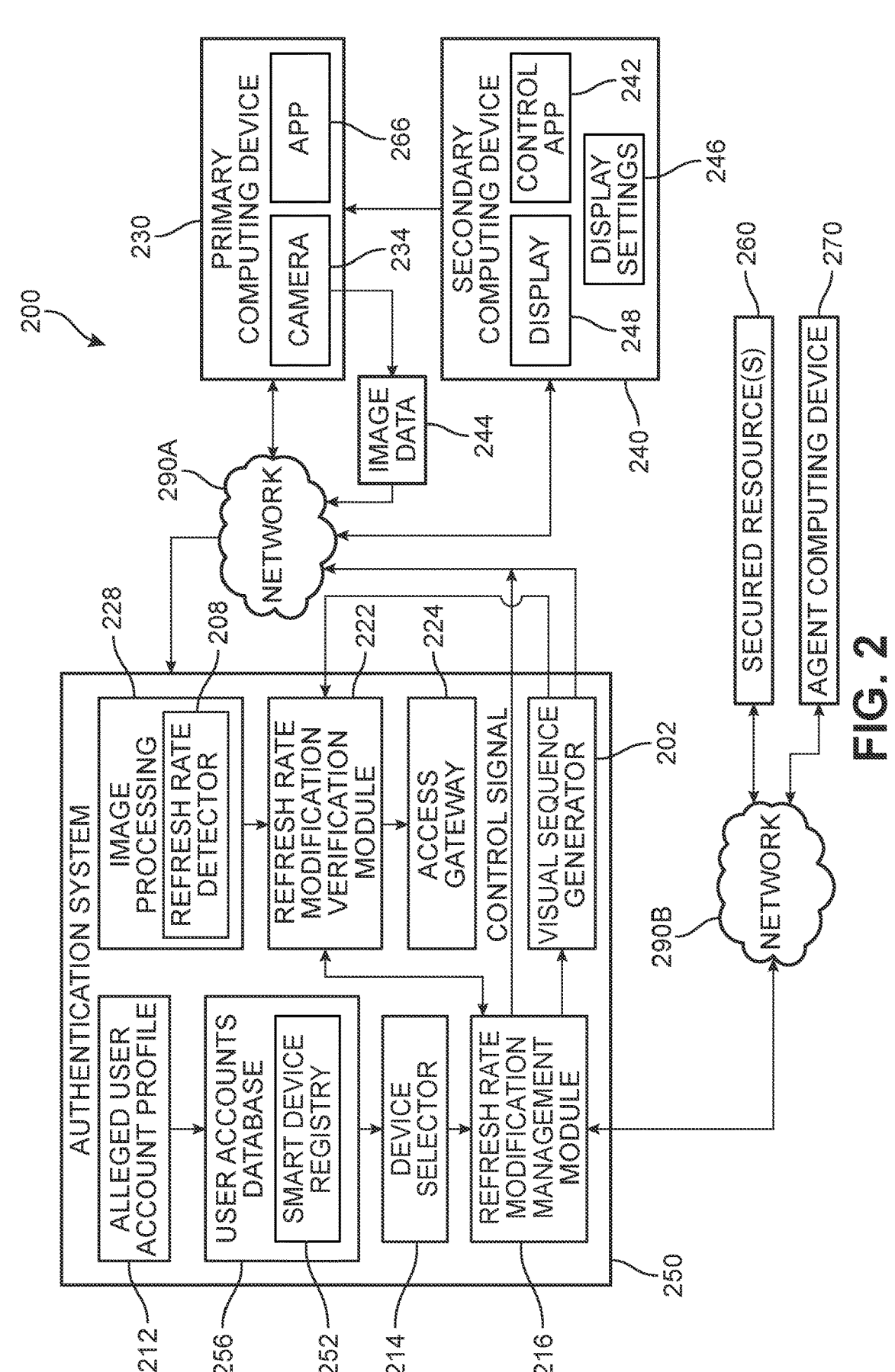
FIG. 2 is an overview of an environment of a refresh rate detection-based access system, according to an embodiment.

In order to provide the reader with a greater appreciation of the embodiments, FIG. 2 depict an overview of an embodiment of an access management environment 200. The environment 200 is configured to manage a device refresh rate as well as obtain image data which is used to determine an authenticity of the video. The two figures are separated for purposes of clarity, but the two drawings represent aspects of the same environment. It should be understood that the environment 200 is presented is for purposes of illustration only, and other embodiments may utilize different or additional components or processes. The environment 200 may alternatively include additional, fewer, or different components. For example, the environment may include additional storage devices, additional servers, additional computing devices, and other features not shown in FIG. 2.

In FIG. 2, the environment 200 can be seen to include an access management system ("system") 250, a secondary computing device ("secondary device") 240, a primary computing device ("primary device") 230, and an optional agent computing device ("agent device") 270. In one example, system 250 is hosted on a server or other computing system. Devices and components of environment 200 can communicate with each other and with other components of environment 200 over one or more networks (shown here as 290A and 290B, and referred to collectively as 290). The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries.

It can be seen in FIG. 2 that agent device 270, secondary device 240, primary device 230, and system 250 can be configured to work in conjunction with a telephony/video-conferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, application can be configured to present various interfaces by which administrator or other users can interact with features of system 250. In this case, primary device 230 includes a telecommunications app 266 through which a user can conduct communication sessions with a remote agent. In addition, secondary device 240 can include the same app or a different app that is configured to receive control signals from system 250 and implement the instructions therein, shown here as a control app 242. In other embodiments, control app 242 of secondary device 240 can be configured as a simple software execution mechanism which receives, translates, and presents output in response to signals transmitted by the system 250.

In different embodiments, the system 250 is capable of communicating with external devices such as agent device 270 (also referred to herein as an administrator computer), the primary device 230 (also referred to herein as the image capture device), and the secondary device 240 (also referred to herein as the controlled or presentation device) through the network 290 using wired or wireless communication capabilities. The system 250 can be understood to comprise a cloud-based server and, along with the agent device 270, may include computing devices comprising any number of components, such as a Network Interface Card (NIC), allowing the respective devices to receive, transmit, process, and store information obtained from the image capture devices. In other words, the environment 200 may include groups or subgroups of computing devices that can communicate with each other, but not necessarily with the computing devices in other groups or subgroups. The environment 200 may include computing devices of disparate types, having different types of hardware and software configurations and in a variety of different locations. In some cases, multiple devices or subsystems can be identified together as a single computing device.

The system 250, agent device 270, primary device 230, and/or secondary device 240 may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

Although not shown in FIG. 2, it should be understood that a virtual or human support agent can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, for example, the agent device can be connected to or include an internet customer interface for providing support specifically to customers or members who contact them via the Internet. As a general matter, support agent can refer to any person or personnel who offers the caller (or person who was called) assistance, and has access to features of the system 250 during the communication session with the customer.

In different embodiments, the system 250 includes or is configured to access one or more databases, such as member profile or a user accounts database 256, and an optional smart device registry 252. The user accounts database 262 is a content library that stores account data related to one or more users. The data may include, for a plurality of users, name, personal and professional details, user facial recognition data, current and past policy for the user, credit limit of users, among other details. The smart device registry 252 stores connection information for known (registered) user devices for which the user has authorized and enabled the input and execution of a control signal. In one embodiment, the registry maintains a listing of one or more smart devices for each end-user subscribed to the control signal-based authentication feature. In different embodiments, the registry 252 therefore includes a protocol providing communication with control app 242 installed on one or more smart devices located in the user's personal space (e.g., residence, workplace, vehicle, etc.) or that are regularly worn by the user an are equipped with or have a connection to a display 248. It can be understood that the end-user has also provided consent to the system for remote access of each of these registered devices as appropriate. For example, a user may have a smart virtual assistant device (e.g., Apple® watch, Amazon Echo®, Google Home®, Google Glass®, Fitbit®, Ringly®, etc.) in their possession. The end-user can permit the system (e.g., components of system 250 and/or agent device 270) access to their smart technology for authentication purposes.

In some embodiments, for example in cases where the user does not own wearable/mobile technology, a user may opt to register multiple smart devices with his or her account. For example, the user may have one smart device saved in the registry 252 for when he/she is in the basement of their home, another for when he/she is on the main floor, and another at their mother's house where they are frequently visiting, etc. The user can identify the location in which the device is stationed, and the system can tag the device listing accordingly. For each device that the user registers, information about a default refresh rate for the device can also be stored. In some embodiments, the device registry 252 can also include information about the maximum refresh rate the device is capable of.

In addition, in different embodiments, the user may opt to provide smart device updates at different intervals. For example, the user may move residences or change jobs, purchase and/or replace smart devices, or experience some other change that may affect the validity of the device access as previously stored, and therefore he/she may request to submit new device data. In other cases, the merchant or other authentication entity may require or recommend that participants provide updated device information twice a year, once a month, or at other less or more frequent intervals to ensure the smart device(s) that are stored is up-to-date. In one embodiment, the smart device listing and associated consent can be linked to an expiration date or period of time after which the participant will be required to provide new (current) device data. In some embodiments, an account for the customer verifying their identification credentials can also be linked to the customer's smart device at or around that time. Thus, a verification process may occur in conjunction with the collection of the initial smart device listing for that user, whereby the participant presents identity documents that can be used to confirm the user's identity. The user identity can then be linked to the identified smart device in the record. These devices can be accessed by system 250 to generate verification output, as will be discussed below. In other examples, the registry 252 may include information for a wearable device that has been designated as serving as the user's secondary device. In such cases, a device selector module 214 will immediately identify the target device. In another embodiment, the registry 252 can include a priority ordering of one or more wearable and/or other smart devices as designated by the user that can be signaled one by one until an image of the device near or on the user responding to the signal is captured.

In different embodiments, when system 250 receives a request for access to a secured resource 260 (access to which is managed by the system 250), their information is used to identify an alleged (i.e., purported, unverified) user account from the user database 256. A process is then triggered in which a rate modification manager module 216 can vary the refresh rate of the selected secondary device associated with the user account. Although in some embodiments, the rate modification manager module 216 provides the refresh rate pattern to the secondary device 240, in other embodiments, the control signal can simply initiate a process in the control app 242 that will locally generate or identify and implement a given refresh rate pattern. In one example, rate modification manager module 216 may select (i.e., at random or following a particular order) a refresh rate pattern that is appropriate for the selected device's default and/or maximum refresh rate. The rate modification manager module 216 includes one or more patterns that may be used for verification purposes. These signals may cause a pattern that is a few milliseconds or less to several seconds in duration to be received by secondary device 240. In some embodiments, at or around the same time, a visual sequence will be provided by visual sequence generator 202 for display at the secondary device 240. In different embodiments, the visual sequence can vary greatly, as noted earlier with respect to FIG. 1. In one embodiment, the visual sequence is selected based on the rate refresh pattern that is selected by rate modification manager module 216. In other words, the visual sequence should include a sequence of frames that will readily reveal the refresh rate pattern (is it slower or faster now?) that will be implemented by the secondary device 240. While in some embodiments the visual sequence is generated by system 250, as shown in FIG. 2, in other embodiments, the visual sequence is generated by the control app 242.

In different embodiments, the control signal sent to the secondary device (e.g., received by the control app 242) will cause a change in display settings 246 to occur at a specific time. In one embodiment, the signal will trigger the control app 242 to initiate the modification of refresh rate in the display settings 246. As a specific non-limiting example, the system 250 causes a change from a lower refresh rate such as 60 Hz to a relatively higher refresh rate such as 90 Hz, 120 Hz, 144 Hz, 165 Hz, 240 Hz, etc. to last a particular duration. In another example, the system 250 causes a change from a higher refresh rate such as 120 Hz to a relatively lower refresh rate such as 30 Hz, 60 Hz, 90 Hz, etc. The switch from one refresh rate to another, different refresh rate can occur once or multiple times during a given verification cycle, and each refresh rate can also be implemented for a specific period of time that can differ with each rate employed. In other words, a refresh pattern can include both (a) frequency and (b) duration. As a non-limiting example, a refresh rate pattern can be implemented as follows: 90 Hz for four seconds, followed by 120 Hz for two seconds, 144 Hz for five seconds, and 60 Hz for ten seconds.

It can be appreciated that the changes to the device's refresh rate can affect the presentation of content on the display 248 of the secondary device 240. In some embodiments, the content that is shown will also be provided by system 250. For example, visual sequence generator 202 may require the secondary device 240 to present a series of image frames such as (but not limited to) repeating blocks of different colors, such as frames of red-red-red-blue-blue-blue-green-green-green, or frames of a series of shapes (e.g., square, rectangle, triangle, etc.). The frames per second over which each specific icon or color will be shown can also be connected to the selected refresh rate. It can be appreciated that in cases where FPS (frames per second, or frame rate) is higher than the refresh rate, the display will not be able to display all of the frames the computing device is producing; therefore, although the refresh rate does not technically limit the frame rate, it does effectively set a cap. For example, the display's refresh rate does effectively limit the frame rate-if the secondary device has an 80 hz display and is capable of outputting 120 FPS, the screen will still only be able to show 80 different images per second. In some embodiments, the system 250 will generate a visual sequence using a frame rate that is higher than the selected refresh rate to ensure that the refresh rate can be detected. This process will be discussed in greater detail below with reference to FIGS. 5A-5C.

In different embodiments, the system 250 can include provisions to ensure or otherwise facilitate the capture of output generated from secondary device 240 by camera 238 of primary device 230. In one embodiment, the agent, via agent computing device 270, can request (via message or voice) that the user move the secondary device into the field of view of the camera 238. It can be appreciated that in some embodiments, the user's face will have been detected during the communication session and can serve as a preliminary authentication credential. This may happen before or during the remote-signaling based authentication procedure. In other words, the person's face can be captured and compared with reference face data stored in the user's profile to determine if there is a match. However, while such a process is helpful, it is increasingly insecure or unreliable due to the proliferation of deep fake technologies and other image-based forgeries. In order to address this threat, the system is configured to send a signal to the user's known (pre-registered) secondary device and capture the output of the secondary device, thereby proving the video is authentic.

In different embodiments, the system can be configured to automatically detect the presence of the secondary device 240 during a video session with the user, and/or generate guidance to the user via app 266 to move the secondary device 240 into a position that optimizes the image capture of the secondary device response to the control signal. For example, with reference to FIG. 1, as the user moves their wrist into the field of view of the camera 238, the app 266 can determine that the display 248 is tilted so as to obstruct a portion of the display 248, and request that the user turn their wrist in a particular direction to better 'see' the display

248. In another example, the secondary device 240 may be out of range of a field of view of camera 238, and the system can automatically present a request to the user to move the designated secondary device 240 into the camera's field of view. In one embodiment, the system will show the user, on a display for the primary device 230, image data 244 being recorded so that the user can move to accommodate the view of the camera.

When a user requests access to secured resource 260, for example via a user interface presented on primary device 230 over network 290, control signal(s) may be generated by system 250, causing a display change in secondary device 240. In some embodiments, primary device 230 is configured to send the recorded image content (image data 244) captured by camera 238 to remote components such as the system 250 and/or the agent device 270. In one embodiment, the transmission of the control signal to the secondary device 240 occurs at the same time or otherwise close in time as a transmission of a camera control signal from system 250 to the primary device 230. The camera control signal is configured to cause the camera 238 to record images during a period of time overlapping with the scheduled output of the secondary device 240. This ensures that the image data 244 is collected when the visual pattern produced by the secondary device 240 occurs.

In different embodiments, image signal processing algorithms and/or software (e.g., image processing module 228) may reside in primary device 230, system 250, agent device 270, and/or other devices of environment 200 and perform pre-processing and processing of the captured image data 244. For example, the image input can be cleansed and normalized by the image processing module 228. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

In some embodiments, machine learning techniques, such as deep learning that includes classification, clustering, and/or other techniques, are trained to detect the specific patterns that may be presented or produced to represent the visual signal received, and are then captured in the image data. Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different pattern types. Some suitable artificial intelligence software is available for public access through open-source AI systems like Caffe, Torch and Theano who provide businesses access to powerful neural networks for processing of their information by AI techniques like deep learning, reinforcement learning and logistic regression, as well as TensorFlow, OpenAI, and BigSur.

In one embodiment, the image signal processing module 228 can classify objects in the image data to determine which image portion represents the secondary device. Once the secondary device is identified, the operation of the secondary device during the period of time in which the control signal is implemented by the secondary device is evaluated. In one embodiment, the system 250 is configured to review the onscreen image data present in the larger image data 244. A refresh rate is determined for the onscreen image data via refresh rate detector 208. A rate modification verification module 222 can then compare the detected refresh rate against the refresh pattern that was supposed to implemented in response to the system's control signal. The expected pattern can be provided by rate modification management module 216 or can be data provided by the control app 242. If the refresh rate patterns match within certain parameters, the user is deemed to pass the authentication or verification test, indicating with a high likelihood that the user is indeed the account holder or other authorized person.

In some embodiments, the image data 244 is processed and models or representations of the image are built. These models are compared against one another. In different embodiments, one or both samples may be deemed unacceptable or unusable if the image is too bright or too dark, or if there is too much noise (poor signal to noise ratio). If a sample is not acceptable the system may request an additional or further sample and again trigger generation of visual indicators from the smart device (either the same signal or a different/new signal).

If the image data is acceptable or sufficient, a scoring occurs via a pattern match determination module 222. The scoring process is analogous to "what is the probability that the refresh rate that was employed by the secondary device is representative of the refresh rate pattern that was to be used?" The returned score is evaluated against a threshold value to determine if it meets or exceeds the minimum acceptable score by access gateway 224. If the score is determined to be successful, the system 250 and/or agent may allow a user to proceed further within a call center or telephone banking menu system or other secured resource 260 being safeguarded by the service provider and/or system 250. In other embodiments, rate modification verification module 222 can be configured such that the pattern detected (if any) from the captured images must directly correspond to the expected visual pattern (based on the visual sequence) in order for a match identification to occur. Otherwise, access is denied, or blocked pending further verification. In some embodiments, the system is configured to then automatically generate a message indicating an unauthorized attempt to access the secured resource may have occurred. In some embodiments, this message can be automatically transmitted by the system to the second computing device or account address for the registered user.

It can be appreciated that authentication based on verification of the user's possession of secondary device 240 strongly implies that the user's identity is true and correspondingly is in fact entitled to whatever access is being requested. It should be understood that while the system 250 bases access decisions at least in part on the detection of the designated visual pattern, in some embodiments, the system is further configured to first confirm that the user ID and optional password match based on information available in the user accounts database 256. Access can then be automatically granted, or the process can serve as a supplementary security measure along with conventional security identifiers.

Figure 3:
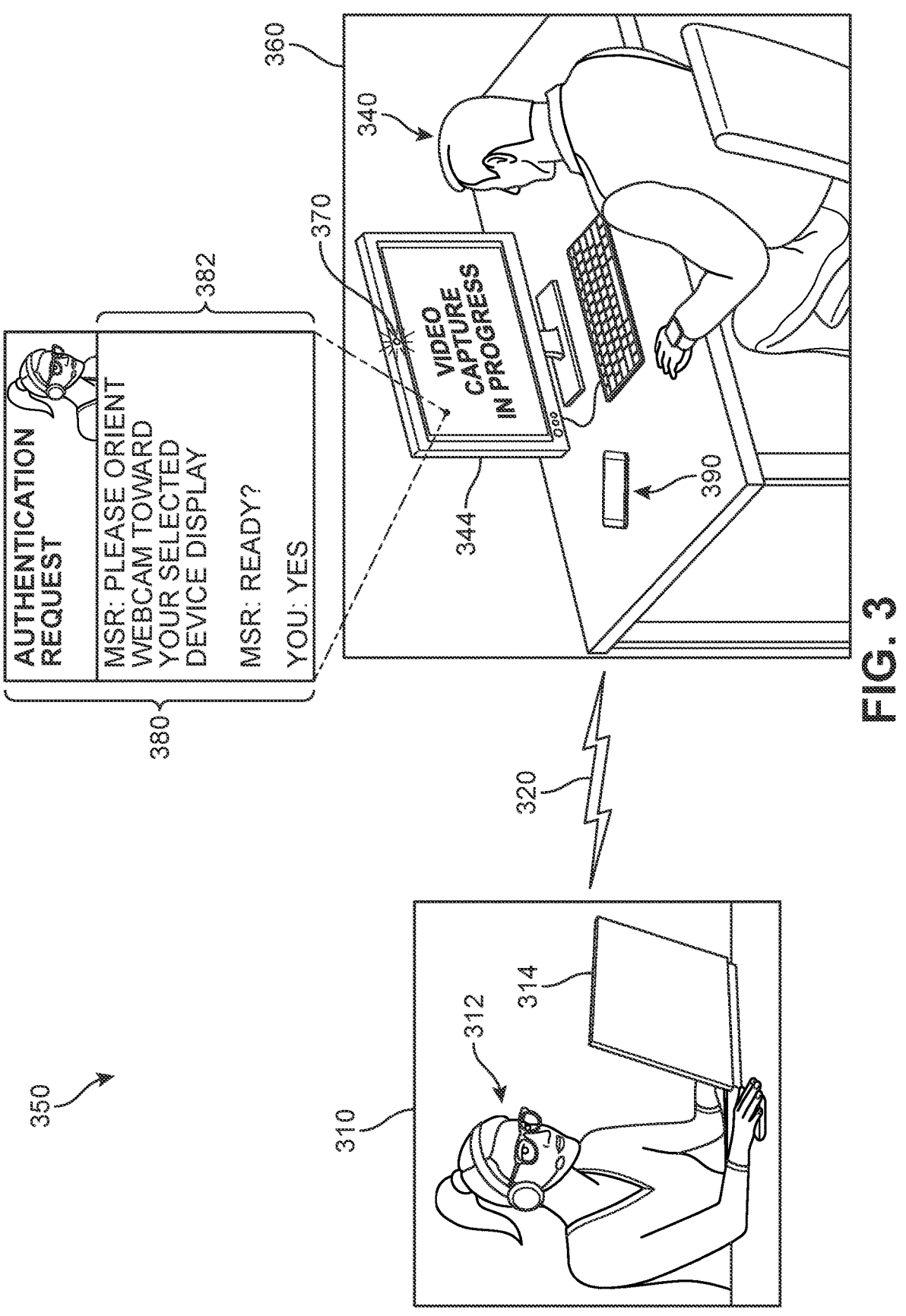
FIGS. 3, 4, 5A, 5B, 5C and 6 are a sequence of drawings depicting an example in which a person is engaged in a video communication session with a service representative and is seeking access to a secured resource based on the presence of a dynamic refresh rate pattern, according to an embodiment.

Referring now to FIGS. 3-6, an example of an authentication scenario occurring during a communication session 350 between a second user 340 and an agent 312 is depicted. In FIG. 3, the second user 340 is, via a first computing device ("first device") 344 at a remote location 360, interacting with the access management service and communicating with an agent 312 via network 320. The first device 344 represents the second user's primary computing device in this scenario. The second user 340 also has a mobile phone 390 which serves as his secondary computing device. The agent 312 is communicating with second user 340 via a third computing device ("third device") 314 located at a site 310 such as a call center or other business.

For purposes of this example, the second user 340 has requested access to secured resources associated with a user account managed by the entity which agent 312 is representing. In this case, a first user interface ("first interface") 380 provides a first chat window 382 to allow the second user 340 to partake in an instant messaging session with second agent 312 ("Authentication Request—MSR: Please orient webcam toward your selected device display/MSR: Ready?/YOU: Yes"). In other embodiments, the communication can occur in part or fully via a video conferencing interface whereby the agent 312 and second user 340 speak in real-time over a video screen. Once the second user 340 provides his consent, an image capturing event is automatically triggered by the system or initiated by the agent 312, and image data collected by an image sensor ("camera") 370.

As shown in FIG. 3, in different embodiments, a user can communicate via an interface generated by a communications application. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video or other media associated with a user interface, or other such information presentation.

Figure 4:
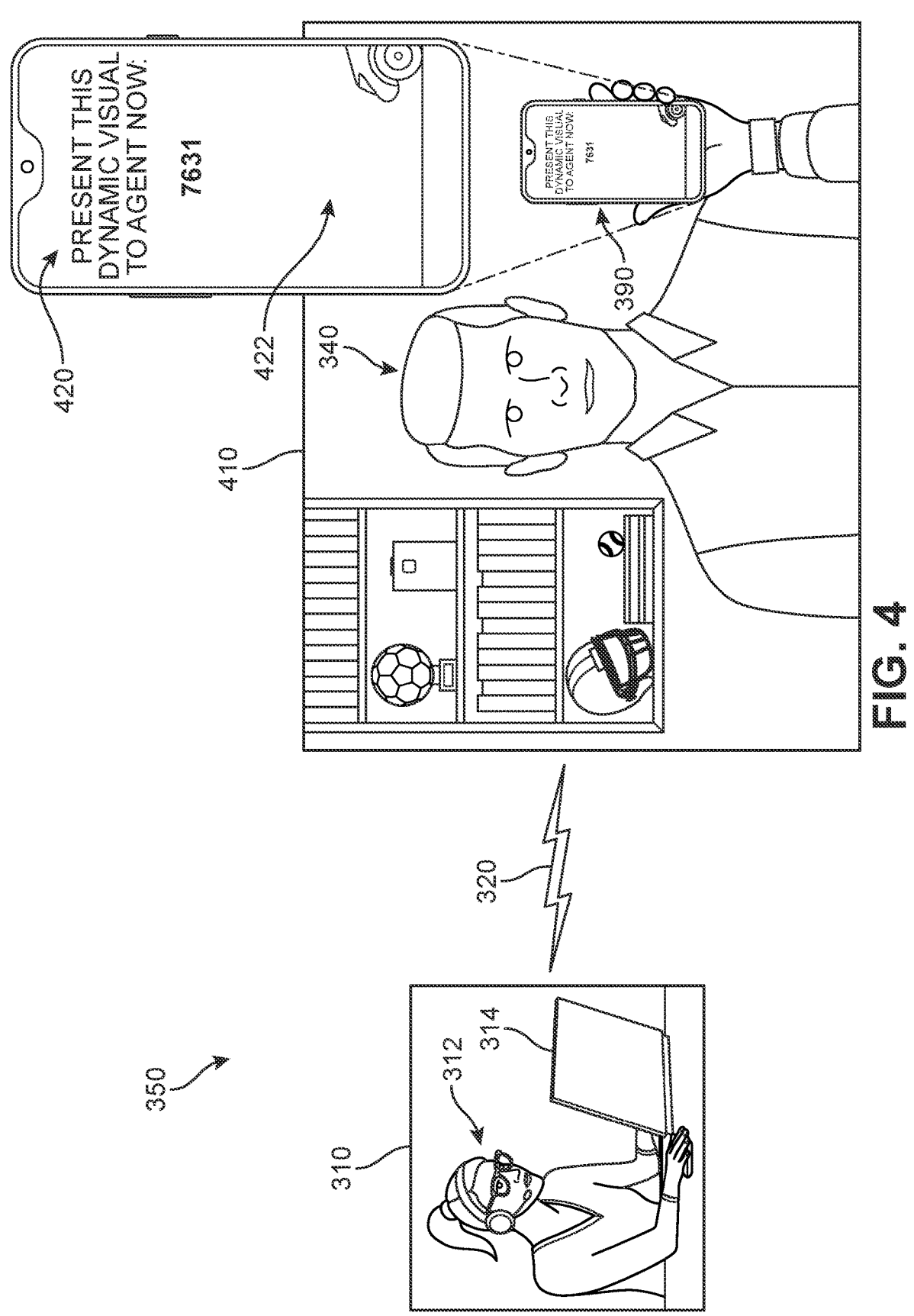

In FIG. 4, a depiction of first image data 410 as viewable by the system and/or agent 312 at the third device 314 via network 320 is shown. The second user 340 has positioned himself in front of a camera for the first device (see FIG. 3). In addition, per the authentication request, the second user 340 moves in order to adjust the pose of his mobile phone 390 (secondary device) to be presented in the field of view of the camera for the user's primary computing device (see FIG. 3). In some embodiments, the agent and/or system can request that a screen 420 for the mobile phone 390 faces toward the camera, as shown in FIG. 4. This allows any pattern or information that is presented on screen 420 to be in the field of view of the camera. For purposes of this disclosure, a pose refers to an object's estimated position and orientation in three dimensions, where position may be specified by linear measurements with respect to orthogonal 3D axes such as X, Y, and Z, and orientation may be specified by angular measurements around the 3D axes, such as by the angles $\theta_x$, $\theta_y$, and $\theta_z$, corresponding to angular measurements with respect to the X, Y, and Z axes, respectively. A pose may be indicated or specified by the vector [X, Y, Z, $\theta_x$, $\theta_y$, $\theta_z$]. In this case, the screen 420 has responded to a first control signal and presents a first visual content 422 ("Present this dynamic visual to agent now: 7631" with a first portion of a vehicle).

Figure 5A:
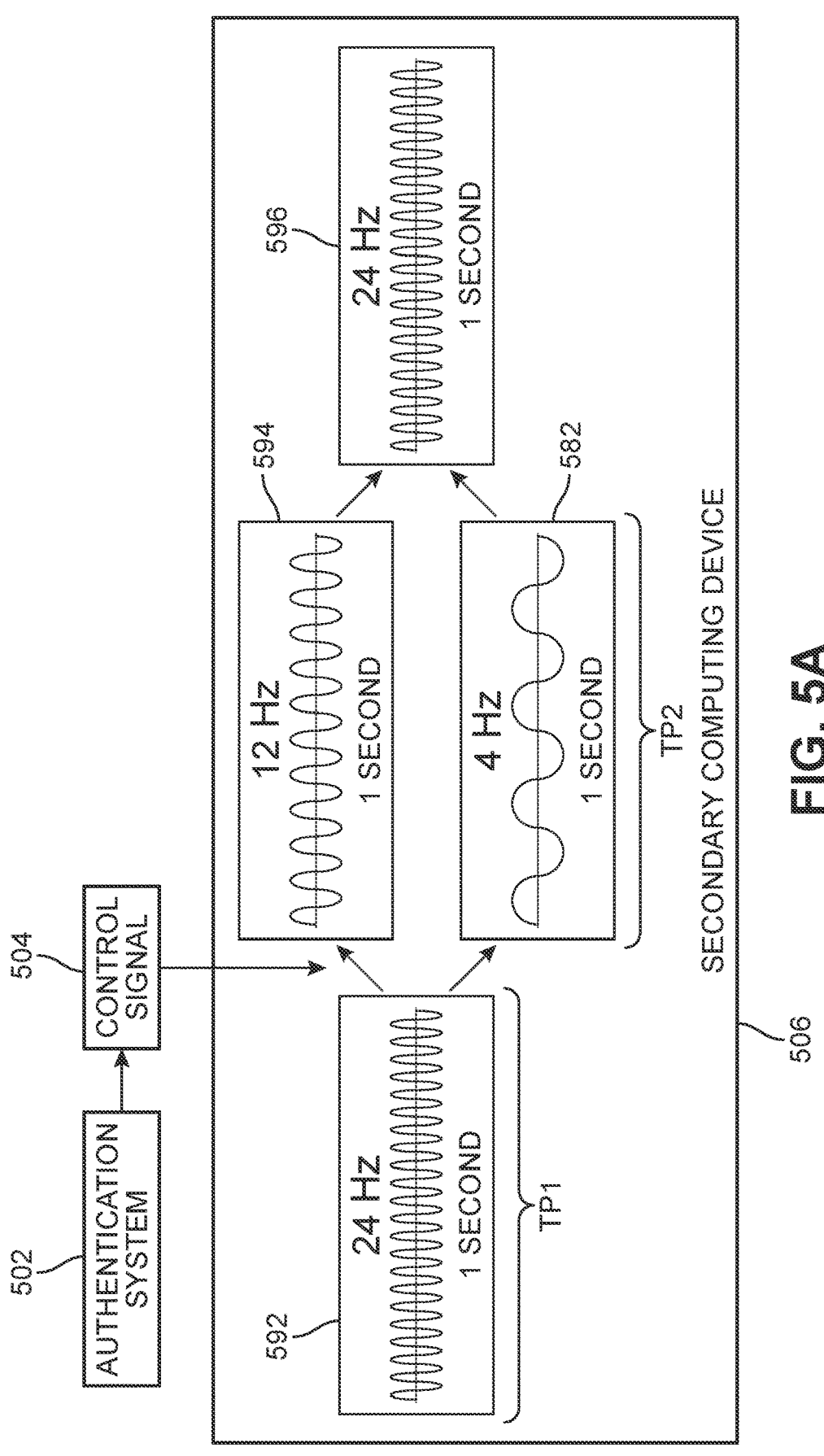

In FIG. 5A, simply for purposes of illustration, a schematic depicting a proposed refresh rate modification process is provided. In this example, an authentication system 502 generates a control signal 504 that is transmitted over a network to a secondary computing device 506. In response, a first refresh rate 592 during a first time period TP1 and corresponds to the default, initial, or 'native' refresh rate for the secondary computing device 506 can be modified. Two examples are shown to better depict the variations that can occur in the refresh rate patterns. In the first example, a second refresh rate 594 is implemented in response to the control signal 504 during a second time period TP2, slower than the first refresh rate by half (24 Hz to 12 Hz). In the second example, a third refresh rate 582 is implemented in response to the control signal 504, slower than the first refresh rate 582 by a sixth (24 Hz to 4 Hz). The frequencies depicted were selected for ease of illustration, and it should be understood that during real-world use of the proposed systems the refresh rates will be much higher. Once the pattern is complete, the secondary computing device 506 can shift to a fourth refresh rate 596 that is the same as native first refresh rate 592. In further illustrations, the refresh rate can be further modulated, for example from the first refresh rate to the second refresh rate to a third, fourth, fifth refresh rates (or more) before returning to the initial refresh rate. If no change of refresh rate occurs in the device display during second time period TP2 (i.e., the rate remains at ~24 Hz), the system would determine that the video has a high likelihood of being generated from a fraudulent source, and deny the purported user access to the secured resource.

Figure 5B:
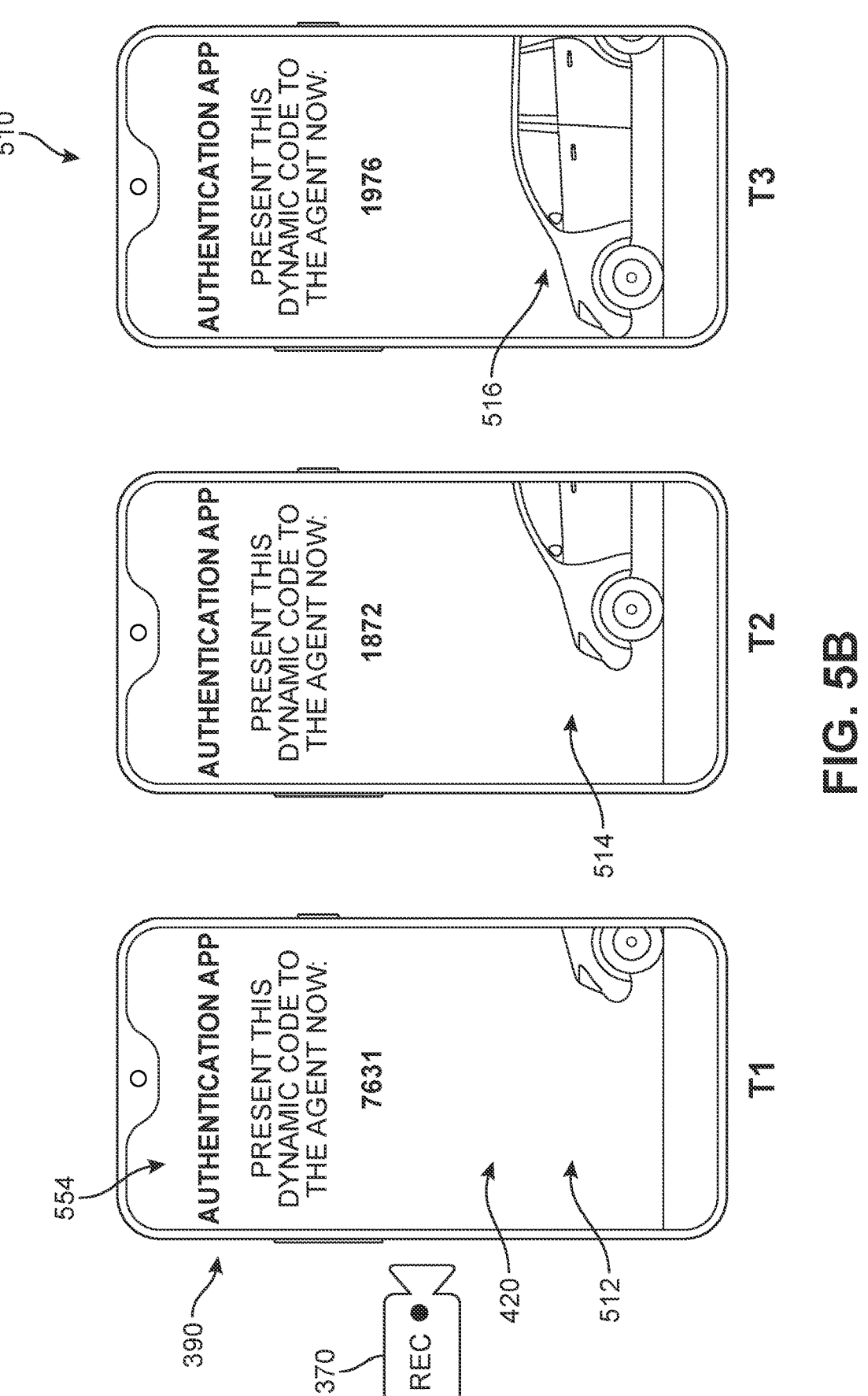
Figure 5C:
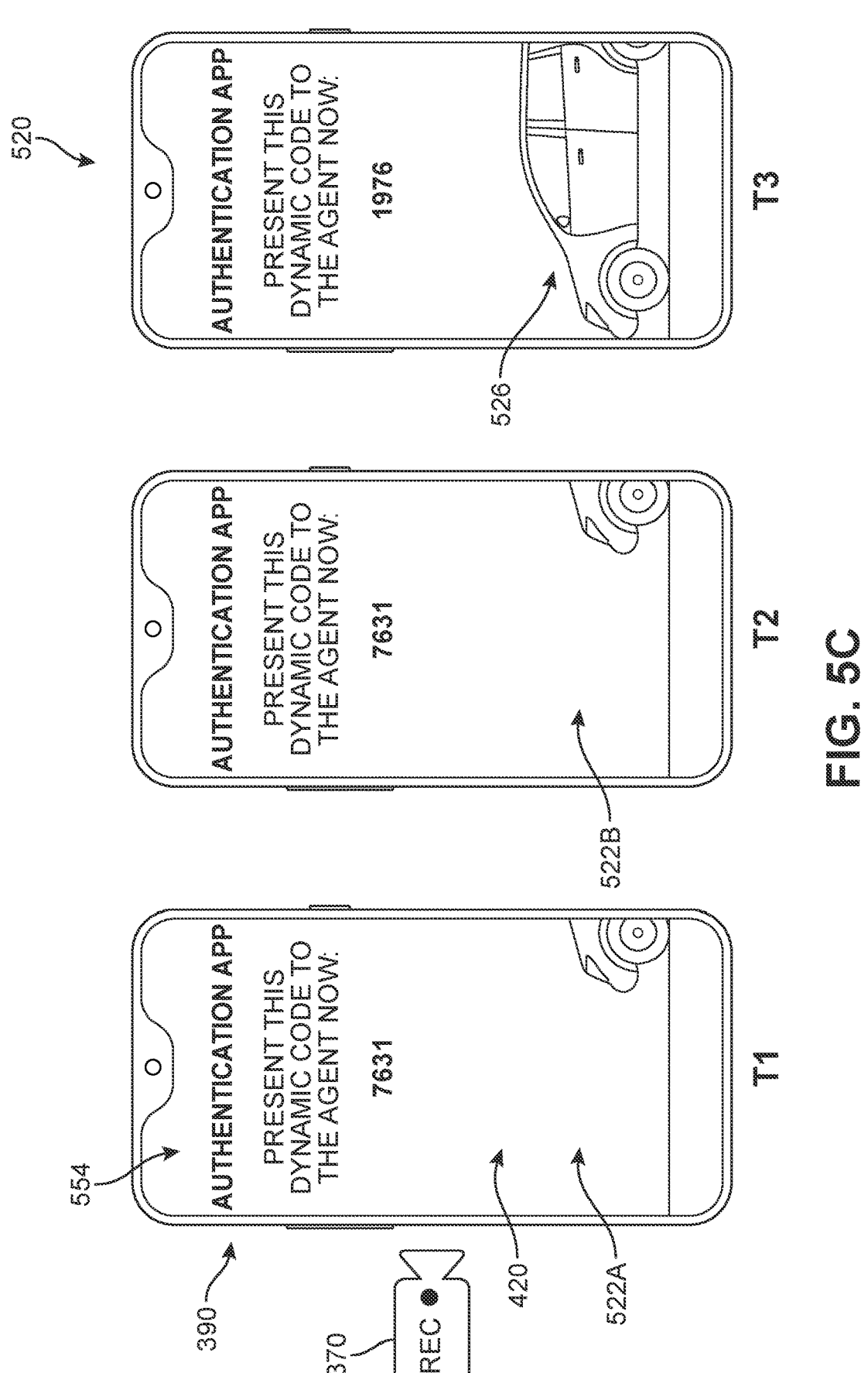

With this context, FIGS. 5B and 5C may be more readily appreciated. FIG. 5A is an example of a refresh rate that would occur (native) in the absence of a control signal (e.g., in deep fake videos) and FIG. 5B is an example of a refresh rate that would occur in response to a control signal (e.g., in authentic videos). In FIG. 5A, the camera 370 of the primary device always captures image data of a scene which includes a view of the display 420 of the mobile phone 390. For purposes of clarity, the mobile phone 390 is shown in isolation. From first time T1 to third time T3, visual content 554 is being presented on the display 420 in a first sequence 510. At a first time T1, a first frame 512 includes a first visual token comprising a first code ("7631") and a first portion of a vehicle. At a second time T2, a second frame 514 includes a second visual token comprising a different second code ("1872") and a larger, second portion of the vehicle that includes the first portion. At a third time T3, a third frame 516 includes a third visual token comprising a different third code ("1976") and a larger, third portion of the vehicle that includes the second portion. In other words, the vehicle appears to be moving across the screen 420 and three different aspects of this motion are shown in the period spanning T1, T2, and T3 in FIG. 5A, reflecting a refresh rate pattern that is steady or unchanging.

In FIG. 5B, from first time T1 to third time T3, visual content 554 is being presented on the display 420 in a second sequence 520. At the first time T1, fourth frame 522a includes the first visual token comprising the first code ("7631") and the first portion of the vehicle. At the second time T2, a fifth frame 522b again includes the first visual token comprising the first code ("7631") and the first portion of the vehicle. In other words, the refresh rate has slowed, and the fifth frame 522b simply refers to the presence of the fourth frame 522a that has been maintained, continued to be presented. At the third time T3, a sixth frame 526 includes the third visual token comprising the third code ("1976") with the larger, third portion of the vehicle that includes the second portion. In other words, the vehicle is still moving across the screen 420, but only two aspects of this motion are shown in the period spanning T1, T2, and T3 in FIG. 5B, reflecting a refresh rate pattern that is slower. Because the slower refresh rate matches the refresh rate implemented via the authentication system, the user with the image data including the second sequence 520 of FIG. 5B will be authenticated, while the user with the image data including the first sequence 510 of FIG. 5A will be blocked.

Figure 6:
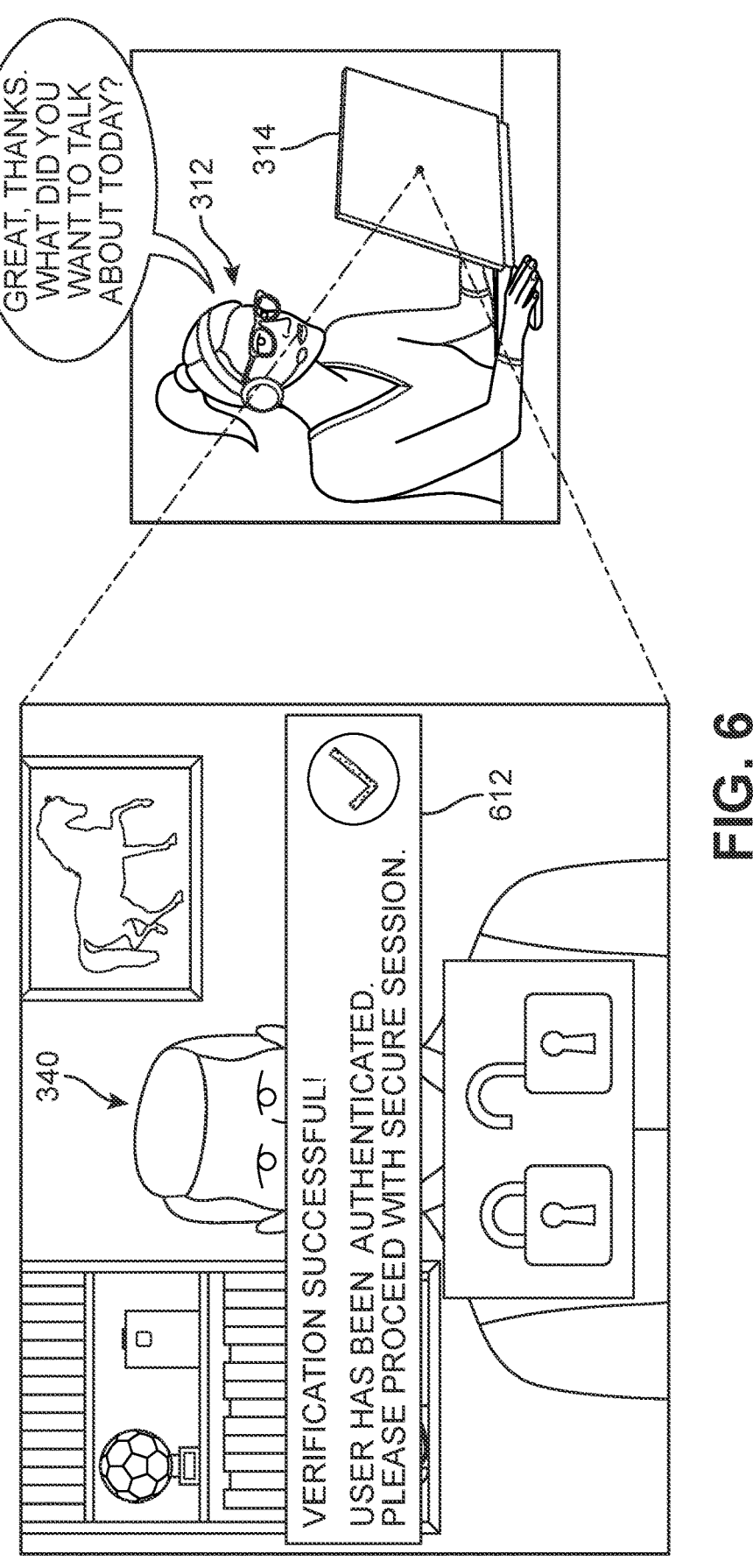

In FIG. 6, the system has processed the image data. In one embodiment, an image classifier can receive the image data and automatically detect the presence of the display for the secondary device. In some embodiments, the configuration of the secondary device (e.g., the size, shape, type, model, etc.) is known to the system, obtained during enrollment and registration of the secondary device in the user profile. The refresh rate pattern detector determines whether the secondary device has presented and/or produced the correct refresh rate pattern to verify the user's identity based on the frames of visual content captured in the image data over a specific period of time. In FIG. 6, the patterns have been determined to be similar enough so as to be classified as a match, as indicated by a status message 612 ("Verification successful! User has been authenticated. Please proceed with secure session") presented to the agent. The system can then automatically enable or grant the second user 340 to access the secured resource, or the agent can respond to the verification by manually enabling access. In other embodiments, the refresh rate can be apparent to the human agent viewing the video, and observation of the expected modification of the refresh rate can allow the human agent to manually enable access to the secured resource.

FIG. 7 is a flow chart illustrating an embodiment of a method 700 of verifying an authenticity of image data (video) in order to protect user resources. The method 700 includes a first step 710 of receiving, at an authentication computing system and from a first computing device, a request to access a secured resource of a first user, and a second step 720 of transmitting, from the authentication computing system and in response to the request, a first control signal to a second computing device associated with the first user to implement a dynamic refresh rate pattern. In one embodiment, the first control signal includes instructions for modifying a refresh rate of a display for the second computing device. A third step 730 includes receiving, at the authentication computing system, first image data captured by the first computing device when implementation of the dynamic refresh rate pattern via the second computing device was to have occurred. In some embodiments, the first image data also includes a face of a person. A fourth step 740 includes determining, based on content shown on a screen of the second computing device present in the first image data, that the first image data includes a representation of the dynamic refresh rate pattern (or otherwise indicates a high likelihood of the dynamic refresh pattern having been used when displaying content on the screen as the image was being recorded/captured), and a fifth step 750 includes determining or concluding, in response to the first image data including a representation of the dynamic refresh rate pattern, that the first image data is an authentic image of the first user, thereby granting access to the secured resource via the first computing device.

In other embodiments, the method may include additional steps or aspects. In one example, the method 700 also includes a step of transmitting, from the authentication computing system and to the first computing device, a second control signal including instructions to capture image data at a first time, thereby causing the first computing device to capture image data via a camera associated with the first computing device. In some embodiments, the first control signal causes an application running on the second computing device to modify the refresh rate of the display. In one embodiment, the first control signal causes a visual sequence including a specific set of image frames to be rendered on a screen of the second computing device.

In some embodiments, the method 700 further includes steps of receiving access information for the second computing device at a second time earlier than the first time, storing the access information in a first record linked to the first user identity, and using the access information to request that the second computing device perform an operation in response to the first control signal. In one example, the secured resource includes one of a service, feature, and information for which access is restricted to one or more authorized persons. In another example, the first image data is obtained during a telephone or videoconferencing session between the first user and a service representative associated with the secured resource. In some embodiments, the second computing device is one of a wearable smart device and mobile computing device. In another example, the dynamic refresh rate pattern includes at least two different refresh rates.

Other methods may be contemplated within the scope of the present disclosure. For example, in some embodiments, a method of detecting fraudulent attempts to obtain access to secure user data using image data is disclosed. The method includes a first step of receiving, at an authentication computing system and from a first computing device, a request to access a secured resource of a first user, and a second step of transmitting, from the authentication computing system and in response to the request, a first control signal to a second computing device associated with the first user to implement a dynamic refresh rate pattern, the first control signal including instructions for modifying a refresh rate of a display for the second computing device (and produce the dynamic refresh rate pattern). In addition, a third step includes receiving or obtaining, at the authentication computing system, first image data captured by the first computing device when implementation of the dynamic refresh rate pattern via the second computing device was to have occurred, the first image data also including a face of a person. A fourth step includes determining that the first image data fails to include a representation of a dynamic refresh rate pattern, and a fifth step includes determining, in response to the first image data failing to include a representation of the dynamic refresh rate pattern, that there is a high likelihood of the request originating from a fraudulent source, with a sixth step of denying the request and blocking access to the secured resource in response to the failure.

In such embodiments, the method may include additional steps or aspects. In some embodiments, the method also includes a step of transmitting, from the authentication computing system and to the first computing device, a second control signal including instructions to capture image data at a first time, thereby causing the first computing device to capture image data via a camera associated with the first computing device. In another example, the method further includes steps of receiving access information for the second computing device at a second time earlier than the first time, storing the access information in a first record linked to the first user identity, and using the access information to request that the second computing device perform an operation in response to the first control signal. In one embodiment, the secured resource includes one of a service, feature, and information for which access is restricted to one or more authorized persons. In some embodiments, the first image data is obtained during a telephone or videoconferencing session between a user of the first computing device and a service representative associated with the secured resource. In one example, the first image data is at least partially generated using deep fake technology. In some embodiments, the method also includes steps of generating a message indicating an unauthorized attempt to access the secured resource may have occurred, and automatically transmitting the message to the second computing device. In some embodiments, the method can also include a step of automatically blocking access to the secured resource pending a review by an agent or the verified account holder for the secure resource.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LAN (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of verifying an authenticity of images in order to protect user resources, the method comprising:

receiving, at an authentication computing system and from a first computing device, a request to access a secured resource of a first user;

transmitting, from the authentication computing system and in response to the request, a first control signal to a second computing device associated with the first user to implement a dynamic refresh rate pattern, the first control signal including instructions for modifying a refresh rate of a display of the second computing device;

receiving, at the authentication computing system, first image data captured by the first computing device when implementation of the dynamic refresh rate pattern via the second computing device was to have occurred, the first image data also including a face of a person;

determining, based on content shown on a screen of the second computing device present in the first image data, that the first image data includes a representation of the dynamic refresh rate pattern;

determining, in response to the first image data including a representation of the dynamic refresh rate pattern, that the first image data is an authentic image of the first user; and granting based on the determination that the first image data is an authentic image of the first user, access to the secured resource via the first computing device.

2. The method of claim 1, further comprising transmitting, from the authentication computing system and to the first computing device, a second control signal including instructions to capture image data at a first time, thereby causing the first computing device to capture image data via a camera associated with the first computing device.

3. The method of claim 1, wherein the first control signal causes an application running on the second computing device to modify the refresh rate of the display.

4. The method of claim 1, wherein the first control signal causes a visual sequence including a specific set of image frames to be rendered on a screen of the second computing device.

5. The method of claim 1, further comprising:

receiving access information for the second computing device at a second time earlier than the first time;

storing the access information in a first record linked to the first user identity; and using the access information to request that the second computing device perform an operation in response to the first control signal.

6. The method of claim 1, wherein the secured resource includes one of a service, feature, and information for which access is restricted to one or more authorized persons.

7. The method of claim 1, wherein the first image data is obtained during a telephone or videoconferencing session between the first user and a service representative associated with the secured resource.

8. The method of claim 1, wherein the second computing device is one of a wearable smart device and mobile computing device.

9. The method of claim 1, wherein the dynamic refresh rate pattern includes at least two different refresh rates.

10. A computer-implemented method of detecting fraudulent attempts to obtain access to secure user data using image data, the method comprising:

receiving, at an authentication computing system and from a first computing device, a request to access a secured resource of a first user;

transmitting, from the authentication computing system and in response to the request, a first control signal to a second computing device associated with the first user to implement a dynamic refresh rate pattern, the first control signal including instructions for modifying a refresh rate of a display for the second computing device;

receiving, at the authentication computing system, first image data captured by the first computing device when implementation of the dynamic refresh rate pattern via the second computing device was to have occurred, the first image data also including a face of a person;

determining that the first image data fails to include a representation of a dynamic refresh rate pattern;

determining, in response to the first image data failing to include a representation of the dynamic refresh rate pattern, that there is a high likelihood of the request originating from a fraudulent source; and denying, based on the high likelihood of the request originating from a fraudulent source, the request to access the secured resource.

11. The method of claim 10, further comprising transmitting, from the authentication computing system and to the first computing device, a second control signal including instructions to capture image data at a first time, thereby causing the first computing device to capture image data via a camera associated with the first computing device.

12. The method of claim 10, further comprising:

receiving access information for the second computing device at a second time earlier than the first time;

storing the access information in a first record linked to the first user identity; and using the access information to request that the second computing device perform an operation in response to the first control signal.

13. The method of claim 10, wherein the secured resource includes one of a service, feature, and information for which access is restricted to one or more authorized persons.

14. The method of claim 10, wherein the first image data is obtained during a telephone or videoconferencing session between a user of the first computing device and a service representative associated with the secured resource.

15. The method of claim 10, wherein the first image data is at least partially generated using deep fake technology.

16. The method of claim 10, further comprising:

generating a message indicating an unauthorized attempt to access the secured resource may have occurred; and automatically transmitting the message to the second computing device.

17. A system for verifying an authenticity of images in order to protect user resources, the system comprising a processor and non-transitory computer readable media including instructions which, when executed by the processor, cause the processor to:

receive, at an authentication computing system and from a first computing device, a request to access a secured resource of a first user;

transmit, from the authentication computing system and in response to the request, a first control signal to a second computing device associated with the first user to implement a dynamic refresh rate pattern, the first control signal including instructions for modifying a refresh rate of a display for the second computing device;

obtain, at the authentication computing system, first image data captured by the first computing device when implementation of the dynamic refresh rate pattern via the second computing device was to have occurred, the first image data also including a face of a person;

determine, based on content shown on a screen of the second computing device present in the first image data, that the first image data includes a representation of the dynamic refresh rate pattern;

determine, in response to the first image data including a representation of the dynamic refresh rate pattern, that the first image data is an authentic image of the first user; and granting, based on the determination that the first image data is an authentic image of the first user, access to the secured resource via the first computing device.

18. The system of claim 17, wherein the instructions further cause the processor to transmit, from the authentication computing system and to the first computing device, a second control signal including instructions to capture image data at a first time, thereby causing the first computing device to capture image data via a camera associated with the first computing device.

19. The system of claim 17, wherein the first control signal causes an application running on the second computing device to modify the refresh rate of the display.

20. The system of claim 17, wherein the first control signal causes a visual sequence including a specific set of image frames to be rendered on a screen of the second computing device.

* * * * *